/

US009825875B2

(12) United States Patent  
Bhatia et al.

(10) Patent No.: US 9,825,875 B2  
(45) Date of Patent: Nov. 21, 2017

(54) METHOD AND APPARATUS FOR PROVISIONING RESOURCES USING CLUSTERING

(71) Applicants: Alcatel-Lucent USA Inc., Murray Hill, NJ (US); ALCATEL LUCENT, Boulogne-Billancourt (FR)

(72) Inventors: Randeep S Bhatia, Green Brook, NJ (US); Bhawna Gupta, Basking Ridge, NJ (US); Elisha Rosensweig, Ra'anana (IL)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 266 days.

(21) Appl. No.: 14/674,812

(22) Filed: Mar. 31, 2015

(65) Prior Publication Data

US 2016/0294722 A1    Oct. 6, 2016

(51) Int. Cl.
*G06F 15/173* (2006.01)
*H04L 12/911* (2013.01)
*H04L 12/24* (2006.01)
*H04L 12/26* (2006.01)

(52) U.S. Cl.
CPC .............. *H04L 47/70* (2013.01); *H04L 43/10* (2013.01); *H04L 41/5012* (2013.01); *H04L 41/5096* (2013.01); *H04L 43/0876* (2013.01); *H04L 43/16* (2013.01)

(58) Field of Classification Search
USPC ......................................................... 709/226
See application file for complete search history.

(56) References Cited

U.S. PATENT DOCUMENTS

| | | | | |
|---|---|---|---|---|
| 5,603,029 A | * | 2/1997 | Aman ..................... | G06F 9/505 707/999.2 |
| 6,249,800 B1 | * | 6/2001 | Aman ................. | H04L 67/1012 709/229 |
| 2007/0240161 A1 | * | 10/2007 | Prabhakar ............. | G06F 9/5044 718/104 |
| 2012/0053925 A1 | * | 3/2012 | Geffin ................... | G06F 1/3206 703/21 |

(Continued)

OTHER PUBLICATIONS

"K-means clustering", From Wikipedia, the free enclycopedia; published online at: https://en.wikipedia.org/wiki/K-means_clustering, 12 pages.

(Continued)

*Primary Examiner* — Michael Y Won  
(74) *Attorney, Agent, or Firm* — Kramer & Amado, P.C.

(57) ABSTRACT

Various embodiments provide a method and apparatus for allocating resources to applications (e.g., application processes) using pre-provisioned resource configurations (e.g., VMs or containers) that are based on clustered historical resource usage data. In particular, the set of pre-provisioned resources required to support elasticity in a set of applications is reduced by determining a subset of pre-provisioned resource configurations that are able to be reused across multiple applications. A pre-provisioned resource configuration being based on a determined dominant center for the resource cluster associated with the pre-provisioned resource configuration.

22 Claims, 4 Drawing Sheets

(56) References Cited

U.S. PATENT DOCUMENTS

| | | | | |
|---|---|---|---|---|
| 2013/0123996 A1* | 5/2013 | Matos | ............... | G06F 1/26 |
| | | | | 700/291 |
| 2013/0179893 A1* | 7/2013 | Ferdous | ............... | G06F 11/3089 |
| | | | | 718/104 |
| 2014/0079207 A1* | 3/2014 | Zhakov | ............... | H04M 3/5175 |
| | | | | 379/265.03 |
| 2014/0095422 A1* | 4/2014 | Solomon | ............... | G06N 5/02 |
| | | | | 706/46 |
| 2015/0173100 A1* | 6/2015 | Aydin | ............... | H04W 72/0426 |
| | | | | 370/329 |
| 2015/0317081 A1* | 11/2015 | Singh | ............... | G06F 9/48 |
| | | | | 711/114 |

OTHER PUBLICATIONS

"VMWare, Virtual Center 2, Template Usage and Best Practices" published online at: http://www.vmware.com/pdf/vc_2_templates_usage_best_practices_wp.pdf. 13 pages.

V. Chvatal, "A Greedy Heuristic for the Set-Covering Problem", Mathematics of Operations Research, vol. 4, No. 3, Aug. 1979, pp. 233-235.

B. Doughterty et al, "Model-driven autoscaling of green cloud computing infrastructure", Future Generation, Comp. Syst. vol. 28, No. 2, Feb. 2012, pp. 371-378.

\* cited by examiner

METHOD AND APPARATUS FOR PROVISIONING RESOURCES USING CLUSTERING

TECHNICAL FIELD

The invention relates generally to methods and apparatus for provisioning resources.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known resource allocation schemes, resource allocation is scaled automatically. For example, on-demand provisioning of virtual machines (VMs) may make use of pre-provisioned VMs or their images.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for allocating resources to applications (e.g., application processes) using pre-provisioned resource configurations (e.g., VMs or containers) that are based on clustered resource usage data. In particular, the set of pre-provisioned resources required to support elasticity in a set of applications is reduced by determining a subset of pre-provisioned resource configurations that are able to be reused across multiple applications. A pre-provisioned resource configuration being based on a determined dominant center for the resource cluster associated with the pre-provisioned resource configuration.

In a first embodiment, an apparatus is provided for providing resource allocation. The apparatus includes a data storage and a processor communicatively connected to the data storage. The processor is programmed to: determine a plurality of available resources and a plurality of applications; determine an input dataset, the input dataset comprising a plurality of data points indicating an expected resource usage occurring within a future time period and associated with one of the plurality of applications; and determine a plurality of pre-provisioned resource set types based on the plurality of available resources and the input dataset. Where a first pre-provisioned resource set type is configured to provide automatic resource scaling of a first plurality of the plurality of applications and a second pre-provisioned resource set type is configured to provide automatic resource scaling of a second plurality of the plurality of applications, the plurality of pre-provisioned resources types comprising the first and second pre-provisioned resource set types; and where the first pre-provisioned resource set type is distinct from the second pre-provisioned resource set type.

In a second embodiment, a method is provided for providing resource allocation. The method includes: determining a plurality of available resources and a plurality of applications; determining an input dataset, the input dataset comprising a plurality of data points indicating an expected resource usage occurring within a future time period and associated with one of the plurality of applications; and determining a plurality of pre-provisioned resource set types based on the plurality of available resources and the input dataset. Where a first pre-provisioned resource set type is configured to provide automatic resource scaling of a first plurality of the plurality of applications and a second pre-provisioned resource set type is configured to provide automatic resource scaling of a second plurality of the plurality of applications, the plurality of pre-provisioned resources types comprising the first and second pre-provisioned resource set types; and where the first pre-provisioned resource set type is distinct from the second pre-provisioned resource set type.

In a third embodiment, a non-transitory computer-readable storage medium is provided for providing resource allocation. The non-transitory computer-readable storage medium stores instructions which, when executed by a computer, cause the computer to: determine a plurality of available resources and a plurality of applications; determine an input dataset, the input dataset comprising a plurality of data points indicating an expected resource usage occurring within a future time period and associated with one of the plurality of applications; and determine a plurality of pre-provisioned resource set types based on the plurality of available resources and the input dataset. Where a first pre-provisioned resource set type is configured to provide automatic resource scaling of a first plurality of the plurality of applications and a second pre-provisioned resource set type is configured to provide automatic resource scaling of a second plurality of the plurality of applications, the plurality of pre-provisioned resources types comprising the first and second pre-provisioned resource set types; and where the first pre-provisioned resource set type is distinct from the second pre-provisioned resource set type.

In some of the above embodiments, the first pre-provisioned resource set type is a first pre-provisioned virtual machine type and the second pre-provisioned resource set type is a second pre-provisioned virtual machine type.

In some of the above embodiments, the number of pre-provisioned resource set types is constrained to a predetermined number of distinct resource set configurations.

In some of the above embodiments, the determination of the plurality of pre-provisioned resource set types is further based on a maximum allowed over-provisioning overhead.

In some of the above embodiments, the determination of the plurality of pre-provisioned resource set types is further based on an over-provisioning cost.

In some of the above embodiments, the over-provisioning cost is based the difference between an aggregate of a plurality of first resource requirements corresponding to the input data points and an aggregate of a corresponding plurality of second resource assignments based on the pre-provisioned resource set types.

In some of the above embodiments, the determination of the plurality of pre-provisioned resource set types includes the processor being further programmed to: determine a plurality of (V; f) pairs where V is the plurality of pre-provisioned resource set types and f is a function used for selecting a select resource set type from the plurality of pre-configure resource set types for ones of the plurality of data points.

In some of the above embodiments, the determination of the plurality of pre-provisioned resource set types is further based on minimizing a sum of the squares of the distances between the plurality of data points and corresponding ones of the plurality of pre-provisioned resource set types.

In some of the above embodiments, the determination of the plurality of pre-provisioned resource set types is further based on minimizing a maximum overhead across the plurality of available resources.

In some of the above embodiments, the determination of the plurality of pre-provisioned resource set types is further based on minimizing a maximum worst case over-provisioning.

In some of the above embodiments, the determination of the plurality of pre-provisioned resource set types comprises the processor being programmed to: cluster the plurality of data points into a first cluster comprising a first plurality of data points and a second cluster comprising a second plurality of data points, the plurality of data points comprising the first plurality of data points and the second plurality of data points; determine a first dominant configuration corresponding to the first plurality of data points and a second dominant configuration corresponding to the second plurality of data points; wherein the first dominant configuration comprises a first dc resource type and a second dc resource type and the second dominant configuration comprises a third dc resource type and a fourth dc resource type; and wherein the first dc resource type and second dc resource type dominates each of the first plurality of data points and the third dc resource type and fourth dc resource type dominates each of the second plurality of data points; and further base the determination of the pre-provisioned resource set types based on the first dominant configuration and the second dominant configuration.

In some of the above embodiments, the clustering of the data points is based on an objective of minimizing an over-provisioning cost.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus for allocating resources to applications (e.g., application processes) using pre-provisioned resource configurations (e.g., VMs or containers) that are based on clustered resource usage data. In particular, the set of pre-provisioned resources required to support elasticity in a set of applications is reduced by determining a subset of pre-provisioned resource configurations that are able to be reused across multiple applications. A pre-provisioned resource configuration being based on a determined dominant center for the resource cluster associated with the pre-provisioned resource configuration.

Advantageously, clustering based pre-provisioned resource configurations may provide more cost efficient provisioning without incurring the adverse impact on application SLAs due to under-provisioning since a reduced set of resource configurations may be sufficient to satisfy collective application auto-scaling requirements. Moreover, additional benefits can result from limiting the pool of different resource configurations from which, for example, VMs are allocated/configured for auto-scaling such as avoiding frequent reconfiguration of applications VMs for minor variability in its resource needs. Lowering the re-configuration frequency may reduce the adverse impact on SLAs from the applications having to adjust to the newly allocated set of resources.

Figure 1:
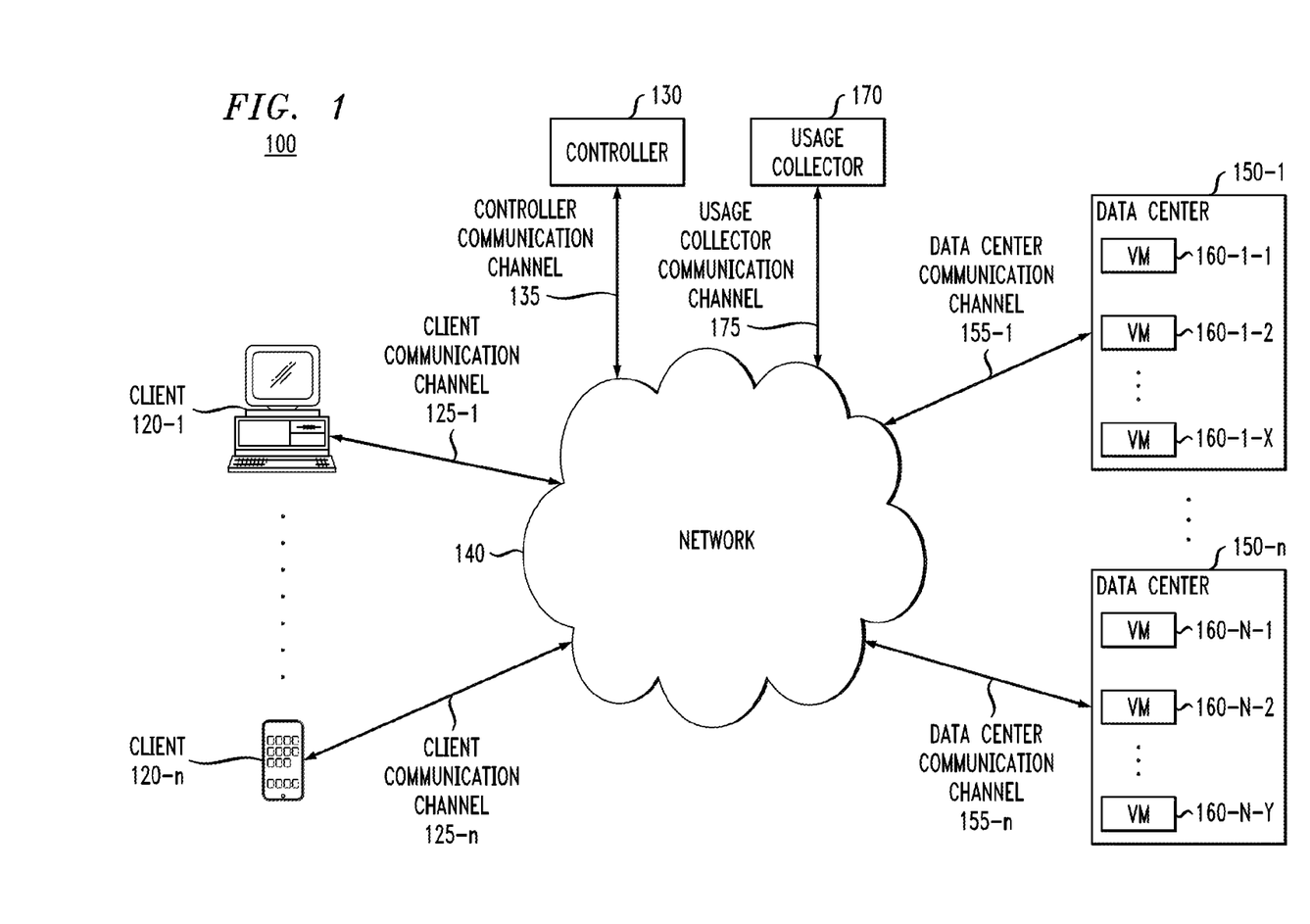
FIG. 1 illustrates a cloud network that includes an embodiment of a system 100 for allocating resources to applications using pre-provisioned resource configurations that are based on clustered resource usage data.

FIG. 1 illustrates a cloud network that includes an embodiment of a system 100 for allocating resources to applications using pre-provisioned resource configurations that are based on clustered resource usage data. The system 100 includes one or more clients 120-1-120-n (collectively, clients 120) accessing one or more application instances (not shown for clarity) residing in one or more virtual machines VM 160-1-1-VM 160-N-Y (virtual machines 160) in one or more data centers 150-1-150-n (collectively, data centers 150) over a communication path. The communication path includes an appropriate one of client communication channels 125-1-125-n (collectively, client communication channels 125), network 140, and one of data center communication channels 155-1-155-n (collectively, data center communication channels 155). Past usage data of the application instances is collected in one or more of data centers 150 by a usage collector 170 communicating with the data centers 150 via usage collector channel 175, the network 140 and an appropriate one of data center communication channels 155. Furthermore, information based on collected data may be transmitted between usage collector 170 and controller 130 via usage collector communication channel 175, the network 140 and controller communication channel 135.

It should be appreciated that although depicted as pre-provisioned VMs herein, resources may be any suitable configuration of resources such as, for example, containers or any other suitable resource grouping. For example, pre-provisioned VM types described herein may be pre-provisioned container types or broadly, pre-provisioned resource set types. Where a resource set type may be any combination of resources and services as described herein such as, for example, two resource types (e.g., memory and storage) and one service (e.g., MySQL). In this example, pre-provisioned resource set types may be {(s1,m1,MySQL=YES), (s2,m2 MySQL=YES), (s1,m3 MySQL=NO)}, where there are three resource set types: (1) (s1,m1, MySQL=YES); (2) (s2,m2, MySQL=YES); and (3) (s1,m3, MySQL=NO), and where s1 and s2 represent two distinct values of storage, m1, m2 and m3 represent three distinct values of memory and "MySQL=" represents whether the MySQL service is included.

Clients 120 may include any type of communication device(s) capable of sending or receiving information over network 140 via one or more of client communication channels 125. For example, a communication device may be a thin client, a smart phone (e.g., client 120-*n*), a personal or laptop computer (e.g., client 120-1), server, network device, tablet, television set-top box, media player or the like. Communication devices may rely on other resources within exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

The communication channels 125, 135, 155 and 175 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI), direct communication (e.g., when controller 130, one of data centers 150 or usage collector 170 are in the same apparatus) and the like. It should be appreciated that though depicted as a single connection, communication channels 125, 135, 155 and 175 may be any number or combinations of communication channels.

Controller 130 may be any apparatus capable of allocating resources using pre-provisioned resource configurations that are based on clustered resource usage data. In particular, controller 130 includes an auto-scaling scheme to allocate resources used by application instances using pre-provisioned VMs (e.g., virtual machines 160) that are based on a clustered input data set of resource usage (i.e., an auto-scaling VM offering (ASVO)). In particular, an input dataset provides a collection of data points which give the expected resource usage of an application's VMs within a future time period based on past resource data usage. Expected resource usage includes: the number of VMs of a given type (configuration) that will be needed during the future time period and the growth trend for each selected VM type.

The pre-provisioned resource configurations being based on a set of determined dominant centers associated with the resource clusters. For example, referring to FIG. 2, there may be seen a depiction 200 of a two dimensional space having dimensions "Dimension 1" and "Dimension 2" (collectively, dimensions), where the dimensions may be any suitable resource or service such as described herein (e.g., resources such as servers, processor cores, memory devices, storage devices, networking devices, etc. and services such as MySQL database, Apache WebServer, etc). The input dataset 201, 202, 203, 204, 205, et al. as indicated by the dots are located in this space. A clustering function, for example k-means clustering, groups the dataset into the four clusters 210, 220, 230, and 240 (e.g., resource usage represented by data points 201-205 are clustered in cluster 210); each cluster having respective cluster centers 211, 221, 231, and 241 (collectively, cluster centers). The cluster centers represent an aggregation of the resource requirements of the subset of data points belonging to the corresponding cluster. An aggregation may be done by any suitable method such as an average, a median or a mean. For example, for VM configurations 201-205, dimension 2 values may be 25, 24, 23, 22, and 19, and based on an averaging of these five VM configurations, dimension 2 of cluster center 211 may be 22.6.

Figure 2:
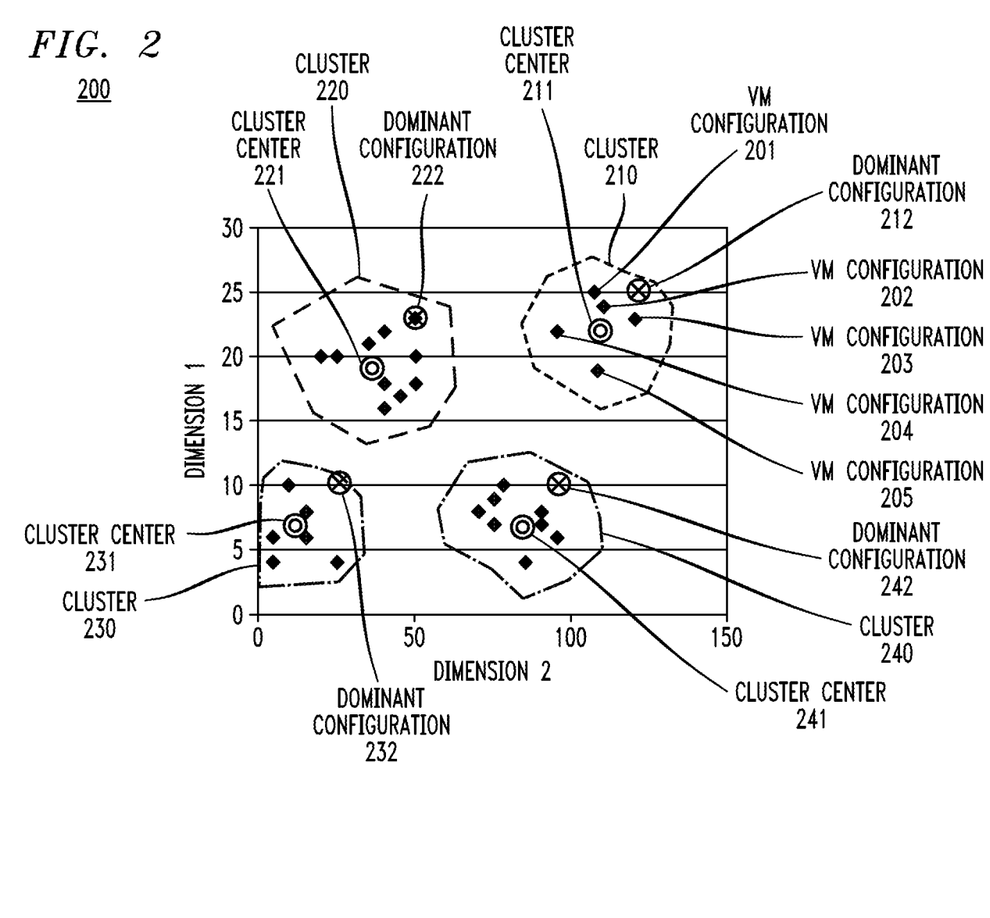
FIG. 2 illustrates a two dimensional space 200 that includes an embodiment of clustering resource usage data with associated pre-provisioned resource configurations.

The dominant configurations 212, 222, 232, and 242 (collectively, dominant configurations) represent the estimated pre-provisioned resource configurations utilized for applications having resource usage characteristic of the subset of data points within the cluster associated with that corresponding dominant configuration. In particular, the selection of the dominant configuration requires that each dimension of the dominant configuration be ≥ the corresponding dimension of each of the data points within the corresponding cluster. In other words, for a dominant configuration such as dominant configuration 212: Dominant-Configuration_$212_{(Dimension2)} \geq$ VMConfiguration(i)$_{(Dimension2)}$; $\forall$i,i∈Cluster_210. This requirement may be achieved using any suitable method such as using a max function, a max function with a padding or the like. For example, for VM configurations 201-205, dimension 2 values may be 25, 24, 23, 22, and 19, and based on the maximum of these five VM configurations, dimension 2 of dominant configuration 212 may be 25 (e.g., max(25,24,23,22,10)). It should be further appreciated that the actual dominant configuration may be based on other factors such as resource configuration units (e.g., memory allocated by a chunk size) and may include a padding value above the maximum resource limit of one or more of the respective resources in the resource set (e.g., max(25,24,23,22,10)+PaddingValue).

It should be appreciated that a subset of VM types may be selected for pre-provisioning using ASVO. It should be further appreciated that while only one controller is illustrated here, system 100 may include more controllers. It should be further appreciated that while depicted separately, one or more of data centers 150 may include controller 130.

The network 140 includes any number of access and edge nodes and network devices and any number and configuration of links. Moreover, it should be appreciated that network 140 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

The data centers 150 include one or more virtual machines 160. Each of virtual machines 160 may include any types or configuration of resources and service any type or number or application instances. Resources may be any suitable device utilized by a virtual machine to process requests from clients 120. For example, resources may be: servers, processor cores, memory devices, storage devices, networking devices or the like. In some embodiments, data centers 150 may be geographically distributed. It should be appreciated that while two data centers are illustrated here, system 100 may include fewer or more data centers.

Usage collector 170 may be any apparatus capable of collecting VM usage data, generating an input dataset based on the usage data and communicating the input dataset to controller 130. It should be appreciated that while only one usage collector is illustrated here, system 100 may include more usage collectors. It should be further appreciated that while depicted separately, one or more of data centers 150 or controller 130 may include usage collector 170.

It should be appreciated that though depicted as communicating between ones of controller 130, usage collector 170 and data centers 150 via network 140 and appropriate communication channels, ones of controller 130, usage collector 170 and data centers 150 may communicate with another one of controller 130, usage collector 170 and data centers 150 through any suitable communication network or may reside in the same communication network or same apparatus as one or more of data centers 150 or controller 130.

Figure 3:
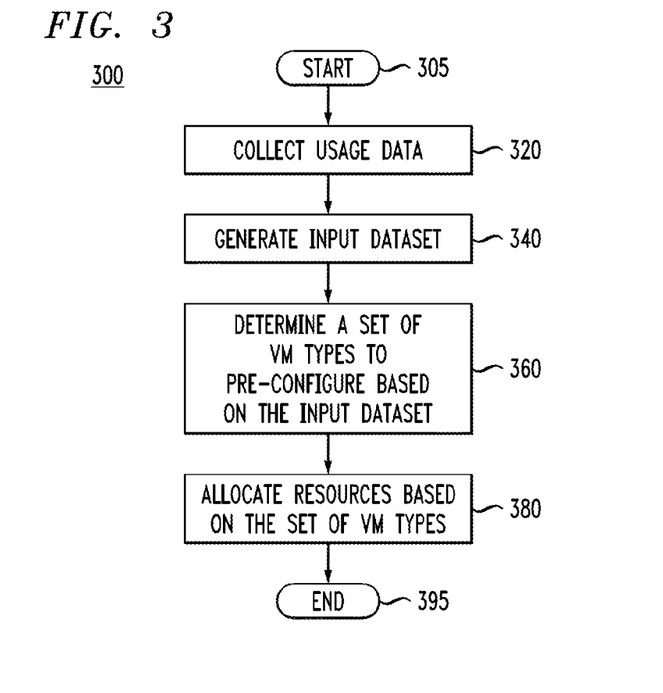
FIG. 3 depicts a flow chart illustrating an embodiment of a method 300 for a system (e.g., system 100 of FIG. 1) to allocate resources using pre-provisioned resource configurations (e.g., virtual machines 160 of FIG. 1)

FIG. 3 depicts a flow chart illustrating an embodiment of a method 300 for a system (e.g., system 100 of FIG. 1) to allocate resources using pre-provisioned resource configurations (e.g., virtual machines 160 of FIG. 1). The method starts at step 305 and includes: collecting usage data (step 320); generating an input dataset (step 340); determining a set of VM types to pre-configure based on the input dataset (step 360); allocating resources based on the set of VM types (step 380); and ending at step 395.

In the method 300, the step 320 includes an apparatus (e.g., usage collector 170) collecting past resource data usage. In particular, as described herein, past usage data includes historical VM usage data and optionally attendant information such as time, day of the week, or impacting events. An impacting event may be any event impacting usage such as, for example, maintenance events or product launch events (e.g., the launch of a new product or product update may cause a spike in VM usage). VM usage information may be collected in any conventional manner. For example, past resource data usage may be collected from a conventional VM performance monitoring product.

In the method 300, the step 340 includes an apparatus (e.g., usage collector 170) generating an input dataset. In particular, as described herein, an input dataset provides a collection of data points which give the expected resource usage of an applications VM within a future time period based on past resource data usage. Expected resource usage includes: the number of VMs of a given type (configuration) that will be needed during the future time period and the expected growth trend for each selected VM type. It should be appreciated that a subset of VM types may be selected for pre-provisioning using ASVO.

In the method 300, the step 360 includes an apparatus (e.g., controller 130 of FIG. 1) determining a set of VM types to pre-configure based on the input dataset as described herein. In particular, a set of distinct optimal VM types to pre-configure are estimated based on the VMs of a given type that will be required for the future time period and the expected growth trend for each VM type (i.e., an ASVO scheme). The optimal set of distinct VM configurations is selected such that by pre-provisioning enough VMs (or their images) for each of these configurations (relative proportions determined based on usage data), the expected current and future resource needs of the applications will be satisfied.

In the method 300, the step 380 includes an apparatus (e.g., controller 130 of FIG. 1 or another virtualization platform (not shown for clarity)) allocating application resources in the face of changing workload demands. It should be appreciated that workload demands surging beyond those configured for an application may be handled by deploying additional resources (e.g. spinning up Virtual Machines) and high utilization is maintained by de-provisioning unnecessary resources (e.g. spinning down Virtual Machines).

In some embodiments of the step 360 or 380, at least a portion of the set of pre-provisioned VMs are in a ready state (i.e., configured, deployed and booted up with all the needed services in a running state). Advantageously, by putting pre-provisioned VM types in a ready state, the system may provide greater performance when handling increased workload demands as compared to waiting to provision additional VMs at the time of the workload surge. Moreover, advantageously, optimizing the set of pre-provisioned configurations of VMs or their images needed to satisfy the rapid auto-scaling requirements of applications may provide for more cost efficient resource utilization.

In some embodiments of the step 360, determining the set of VM types to pre-configure is constrained by an allowed number of distinct VM configurations, the maximum allowed over-provisioning overhead is constrained by a predetermined threshold, or the number of clusters representing the distinct VM configurations is constrained by a predetermined threshold.

In some embodiments of the step 360, determining the set of VM types to pre-configure includes clustering the input dataset representing VM usage. In particular, points are grouped in clusters based on the proximity of the resource requirements of the underlying VMs. In some embodiments, all data points that fall within a cluster would represent VM configurations where one representative VM configuration is sufficient for the entire set and that the estimated over-provisioning overhead incurred would fall below a predetermined threshold. It should be appreciated that the representative VM configuration may be the same as the underlying VM configuration of one or more of the points in the cluster or may be different than all of the points in the cluster. It shoulder be further appreciated that the closer the VM configuration of the point in the cluster as compared to the representative VM configuration, the lower the over-provisioning cost. It should be further appreciated that keeping the total over-provisioning overhead within a cluster (i.e., the "cluster cost") lower is advantageous.

In some embodiments of the step 320, determining past resource data usage is performed by retrieving past resource data usage (e.g., an input dataset) from a data storage or receiving the past resource data usage from an external data source (e.g., a server or database not depicted for purposes of clarity).

In some embodiments of the step 340, generating an input dataset is performed by using conventional machine learning techniques, such as Support Vector Machines or Random Forests on the past resource usage data collected in step 320.

Figure 4:
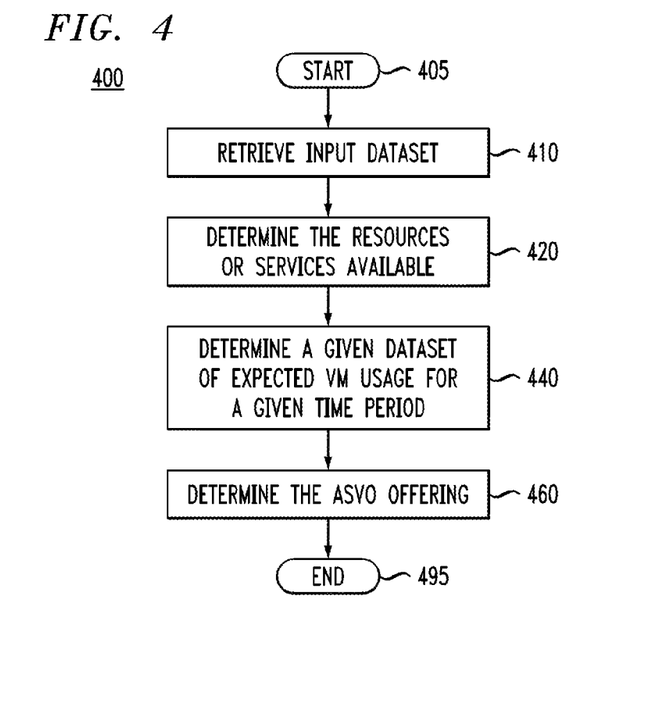
FIG. 4 depicts a flow chart illustrating an embodiment of a method 400 for a controller (e.g., controller 130 of FIG. 1) to perform an ASVO scheme that allocates resources from multiple virtual machines (e.g., virtual machines 160 of FIG. 1) as illustrated in step 360 of FIG. 2.

FIG. 4 depicts a flow chart illustrating an embodiment of a method 400 for a controller (e.g., controller 130 of FIG. 1) to perform an ASVO scheme that allocates resources from multiple virtual machines (e.g., virtual machines 160 of FIG. 1) as illustrated in step 360 of FIG. 3. The method starts at step 405 and includes: retrieving an input dataset (step 410); determining the resources or services available for pre-configuration on a VM; (step 420); determining a given dataset of expected VM usage for a given time period for the applications (step 440); determining the ASVO offering (step 460); and ending at step 495.

In the method 400, the step 410 includes retrieving an input dataset as described herein.

In the method 400, the step 420 includes determining the resources or services available for pre-configuration on a VM. For example, resources such as servers, processor cores, memory devices, storage devices, networking devices, etc. and services such as MySQL database, Apache WebServer, etc. In some embodiments, representing resources and services by "d", a VM configuration is defined by a d-dimensional point whose i-th component represents the number of instances of the i-th resource that are configured for the VM. For example, for a CPU resource this may represent the number of vCPUs configured for the VM and for a service resource such as MySQL database or a Linux OS this may be a binary value depending on whether the corresponding service is configured or not.

In the method 400, the step 440 includes determining a dataset of expected VM usage for the future time period for the applications. In particular, the dataset of expected VM usage can be derived from the input dataset. In some embodiments, the dataset of expected VM usage is represented by U, where U is a collection of VM configurations, and u∈U is a d dimensional point whose i-th component $u_i$ gives the expected usage requirement for the i-th resource during the particular time period by an applications VM.

In the method 400, the step 460 includes determining the ASVO offering. In particular, a set of (V; $f$) pairs are determined where V is a set of distinct VM configurations whose instances (or images) are kept in the pre-provisioned pool and $f$ is a function used for selecting VMs from this pre-provisioned pool to satisfy particular resource requirements. Specifically, V is a set of d-dimensional points of distinct VM configurations, and $f$ is a function for mapping any d-dimensional resource usage point u to a VM configuration $f(u) \in V$. In particular, $f$ maps each point u in U to a resource offering point $f(u) \in V$. In some embodiments, an application that requires VMs with resource requirement u∈U to handle a demand surge is assigned the VMs of configuration $f(u) \in V$ from this pre-provisioned pool.

In some embodiments of the step 460, the function $f$ satisfies $f(u) \geq u$, for all u. In particular, the distinct VM configurations are based on the determined dominant configuration. It should be appreciated that for a resource requirement to be satisfied, the resource configuration of the VM assigned to it dominates on each and every resource. For example, referring to FIG. 2, the value of dimension 1 of dominant configuration 212 is the value of dimension 1 of VM configurations 201-205 and the value of dimension 2 of dominant configuration 212 is ≥ the value of dimension 2 of VM configurations 201-205. Thus, the value of resource type "dimension 1" in the VM configuration representing cluster 210 would be ≥ the value of dimension 1 of dominant configuration 212. In some embodiments, the value of the corresponding research type would be equal to the value of the corresponding resource type in the dominant configuration. In some other embodiments, the value of the corresponding research type would be equal to the value of the corresponding resource type in the dominant configuration+ a padding value.

In some embodiments of the step 460, points in U are clustered such that there is one cluster for every element o∈V and all points u∈U for which $f(u)=o$ are clustered together. It should be appreciated that o can be thought as a dominant center for this cluster since we have $o=f(u) \geq u$ for all points u in this cluster. It should be appreciated that assigning VMs with resource configuration $f(u)$ when the resource requirement is for VMs with configuration u can result in resource over-provisioning. In some embodiments, the ASVO problem is based on selection of the pair (V; $f$) for which this overhead due to over-provisioning (i.e., OOP cost) is an estimated minimal. The OOP cost measures how far apart the points $f(u)$ are from the points u.

In some embodiments of the step 460, the OOP cost is based on the average over-provisioning overhead (AOOP) for the point pairs $(f(u),u)$. In particular, the goal is to minimize the sum of the squares of the distances of the points in U to the closest points in V. In some of these embodiments, point pairs are determined based on equation [Eq.1].

$$\Sigma_{u \in U} \|f(u)-u\|_2^2 \qquad [\text{Eq. 1}]$$

Here the term $\|z\|_2$ refers to the $l_2$ or the distance norm of the point z. The average overhead due to over-provisioning is obtained by dividing this sum by |U|. It should be appreciated that minimizing this sum is equivalent to minimizing the AOOP cost. It should be further appreciated that the AOOP cost may also capture the expected over-provisioning overhead for auto-scaling when the pre-provisioned VM configurations are from the set V and the VM resource usage need is distributed according to the probability distribution implied by U.

In some embodiments of the step 460, the OOP cost is based on the maximum overhead due to over-provisioning (MOOP). In particular, the goal is to minimize the MOOP. In some of these embodiments, point pairs are determined based on equation [Eq.2].

$$\max_{u \in U} \|f(u)-u\|_z \qquad [\text{Eq. 2}]$$

In some embodiments, the goal is to minimize the maximum combined overhead for all resources. In this case z=2 (for $l_2$ norm). In some other embodiments, the goal is to minimize the maximum overhead across all resources. In this case z=∞. It should be appreciated that the term $\|z\|_\infty$ or the infinity norm of a point z is the size of its largest coordinate: $\|z\|_\infty = \max_i |z_i|$.

In some embodiments of the step 460, the OOP cost is based on the maximum due to overprovisioning quantified using point ratios (MOOPR). In particular, the overhead due to over-provisioning may be based on the worst case ratio of the points rather than their difference. In particular, the goal is to minimize the MOOPR. In some of these embodiments, point pairs are determined based on equation [Eq.3].

$$\max_{u \in U} \|f(u)/u\|_\infty \qquad [\text{Eq. 3}]$$

Here the ratio point z=x/y is defined by $$z_i = \frac{x_i}{y_i}, \forall i.$$

In some embodiments of the step 460, resources are weighted according to their contribution to the over-provisioning cost.

In some embodiments of the step 460, the size of the set V may be limited by a predetermined size. It should be appreciated that the size of V determines the required pre-provisioned resource pool size and may impact the likelihood of mismatch of application requirements triggering more frequent re-configurations. In some of these embodiments, a pre-provisioned pool resource budget r is specified to restrict the size of V by |V|≤r. In some other of these embodiments, a budget p is specified for the overhead due to over-provisioning and the AVSO finds the V of minimum size for which this budget is met. In some embodiments, the goal is to minimize a cost function that depends on both the over-provisioning overhead along with the size |V|.

In some embodiments of the step 460, the AOOP cost is minimized according to Eq. 1 by bounding the size |V| by a configuration budget r.

In some of these embodiments, k-means clustering is used to group the points of U into at most k≤r clusters. Points are mapped to clusters based on their distance to the cluster centers. Let $C_1, C_2, \ldots, C_k$ be the clusters found by the k-means algorithm with cluster centers $c_1, c_2, \ldots, c_k$ respectively. Thus, $C_i$ contains those points of U whose closest center is $c_i$ (ties broken arbitrarily) with every point of U assigned to a unique cluster. Thus, k-means clustering implicitly implies a function $f^C:U \rightarrow \{c_1, c_2, \ldots, c_k\}$ that maps points in U to the cluster centers in order to minimize the within-cluster sum of square cost given by [Eq.4].

$$\Sigma_{u \in U} \|f^C(u) - u\|_2^2 \quad [\text{Eq. 4}]$$

Thus, the set $\{c_1, c_2, \ldots, C_k\}$ is a good candidate for the set of VM configurations V if the centers $c_i$ also dominated the points of the cluster $C_i$. This is not necessarily the case as in k-means the center $c_i$ is the centroid (or the average) of the points in the cluster $C_i$. In other words, the function $f^C$ does not necessarily satisfy the resource domination condition $f^C(u) \geq c, \forall u$ for points in U. The algorithm modifies the cluster centers from $\{c_1, c_2, \ldots, c_k\}$ to new centers $\{\dot{c}_1, \dot{c}_2, \ldots, \dot{c}_k\}$ so that the resource domination condition is satisfied for a large fraction of the points, while also bounding the increase in the within-cluster sum of square cost. This process is repeated until the resource domination condition is satisfied for all the points resulting in a solution with bounded performance guarantees.

In some of these embodiments, V begins as an empty set of VM configurations, $f^C$ is an empty mapping function and all the points in U are marked uncovered and the algorithm iteratively clusters the uncovered points. The newly clustered points are marked as covered and are not considered for clustering in subsequent iterations. For each newly found cluster C a point c that satisfies $c \geq u, \forall u \in C$ is added to the set of VM configurations V. The function $f^C$ is updated to include the mapping $f^C(u) = c, \forall u \in C$. The iterations continue until the set of points of U that are marked uncovered becomes empty. Upon completion of the iterations, the set V and the mapping function $f^C$ are determined, i.e., the set of (V; $f$) pairs are determined.

Although primarily depicted and described in a particular sequence, it should be appreciated that the steps shown in methods 300 and 400 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 5:
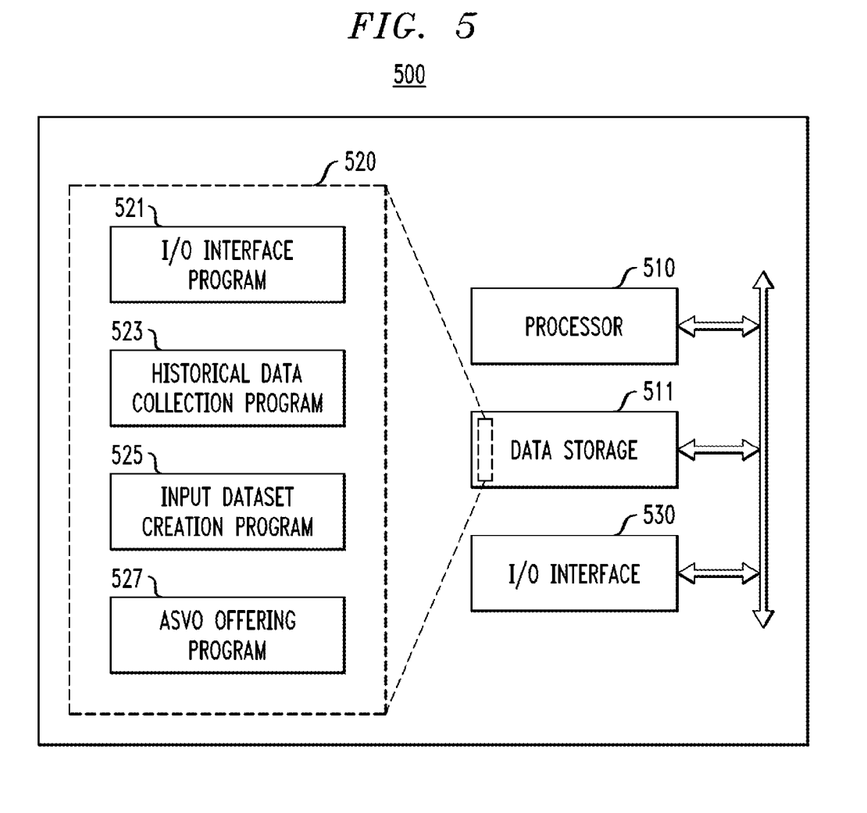
FIG. 5 schematically illustrates an embodiment of various apparatus 500 such as controller 130 and usage controller 170 of FIG. 1.

FIG. 5 schematically illustrates an embodiment of an apparatus 500 such as controller 130 of FIG. 1. The apparatus 500 includes a processor 510, a data storage 511, and an I/O interface 530.

The processor 510 controls the operation of the apparatus 500. The processor 510 cooperates with the data storage 511.

The data storage 511 stores programs 520 executable by the processor 510. Data storage 511 may also optionally store program data such as historical data, the input dataset or the like as appropriate.

The processor-executable programs 520 may include an I/O interface program 521, a historical data collection program 523, an input dataset creation program 525 or an ASVO offering program 527. Processor 510 cooperates with processor-executable programs 520.

The I/O interface 530 cooperates with processor 510 and I/O interface program 521 to support communications over controller communication channel 135 of FIG. 1 as described above.

The historical data collection program 523 performs step 320 of FIG. 3 as described above.

The input dataset creation program 525 performs step 360 of FIG. 3 as described above.

The ASVO offering program 527 performs the steps of method(s) 400 of FIG. 4 or 360 of FIG. 3 as described above.

In some embodiments, the processor 510 may include resources such as processors/CPU cores, the I/O interface 530 may include any suitable network interfaces, or the data storage 511 may include memory or storage devices. Moreover the apparatus 500 may be any suitable physical hardware configuration such as: one or more server(s), blades consisting of components such as processor, memory, network interfaces or storage devices. In some of these embodiments, the apparatus 500 may include cloud network resources that are remote from each other.

In some embodiments, the apparatus 500 may be virtual machine. In some of these embodiments, the virtual machine may include components from different machines or be geographically dispersed. For example, the data storage 511 and the processor 510 may be in two different physical machines.

When processor-executable programs 520 are implemented on a processor 510, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory (s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing resource allocation, the apparatus comprising:
   a data storage; and
   a processor communicatively connected to the data storage, the processor being configured to:
   determine a plurality of available resources and a plurality of applications;
   determine an input dataset, the input dataset comprising a plurality of data points indicating an expected resource usage occurring within a future time period and associated with one of the plurality of applications;
   classify the input dataset into a plurality of clusters based on proximity values of the resource requirements of a plurality of pre-provisioned resource configurations; and
   determine a plurality of pre-provisioned resource set types to pre-configure based on the plurality of available resources and the classified plurality of clusters;
   wherein a first pre-provisioned resource set type is configured to provide automatic resource scaling of a first plurality of the plurality of applications and a second pre-provisioned resource set type is configured to provide automatic resource scaling of a second plurality of the plurality of applications, the plurality of pre-provisioned resources types comprising the first and second pre-provisioned resource set types; and
   wherein the first pre-provisioned resource set type is distinct from the second pre-provisioned resource set type.

2. The apparatus of claim 1, wherein the first pre-provisioned resource set type is a first pre-provisioned virtual machine type and the second pre-provisioned resource set type is a second pre-provisioned virtual machine type.

3. The apparatus of claim 1, wherein the number of pre-provisioned resource set types is constrained to a predetermined number of distinct resource set configurations.

4. The apparatus of claim 1, wherein the determination of the plurality of pre-provisioned resource set types is further based on a maximum allowed over-provisioning overhead.

5. The apparatus of claim 1, wherein the determination of the plurality of pre-provisioned resource set types is further based on an over-provisioning cost.

6. The apparatus of claim 5, wherein the over-provisioning cost is based the difference between an aggregate of a plurality of first resource requirements corresponding to the input data points and an aggregate of a corresponding plurality of second resource assignments based on the pre-provisioned resource set types.

7. The apparatus of claim 1, wherein the determination of the plurality of pre-provisioned resource set types comprises the processor being further configured to:
   determine a plurality of (V; f) pairs where V is the plurality of pre-provisioned resource set types and f is a function used for selecting a select resource set type from the plurality of pre-configure resource set types for ones of the plurality of data points.

8. The apparatus of claim 7, wherein the determination of the plurality of pre-provisioned resource set types is further based on minimizing a sum of the squares of the distances between the plurality of data points and corresponding ones of the plurality of pre-provisioned resource set types.

9. The apparatus of claim 7, wherein the determination of the plurality of pre-provisioned resource set types is further based on minimizing a maximum overhead across the plurality of available resources.

10. The apparatus of claim 7, wherein the determination of the plurality of pre-provisioned resource set types is further based on minimizing a maximum worst case over-provisioning.

11. The apparatus of claim 1, wherein the determination of the plurality of pre-provisioned resource set types comprises the processor being configured to:
   cluster the plurality of data points into a first cluster comprising a first plurality of data points and a second cluster comprising a second plurality of data points, the plurality of data points comprising the first plurality of data points and the second plurality of data points;
   determine a first dominant configuration corresponding to the first plurality of data points and a second dominant configuration corresponding to the second plurality of data points; wherein the first dominant configuration comprises a first dc resource type and a second dc resource type and the second dominant configuration comprises a third dc resource type and a fourth dc resource type; and wherein the first dc resource type and second dc resource type dominates each of the first plurality of data points and the third dc resource type and fourth dc resource type dominates each of the second plurality of data points; and
   further base the determination of the pre-provisioned resource set types based on the first dominant configuration and the second dominant configuration.

12. The apparatus of claim 11, wherein the clustering of the data points is based on an objective of minimizing an over-provisioning cost.

13. A method for providing resource allocation, the method comprising:
 at a processor communicatively connected to a data storage, determining a plurality of available resources and a plurality of applications;
 determining, by the processor in cooperation with the data storage, an input dataset, the input dataset comprising a plurality of data points indicating an expected resource usage occurring within a future time period and associated with one of the plurality of applications; and
 classifying, by the processor in cooperation with the data storage, the input dataset into a plurality of clusters based on proximity values of the resource requirements of a plurality of pre-provisioned resource configurations;
 determining, by the processor in cooperation with the data storage, a plurality of pre-provisioned resource set types to pre-configure based on the plurality of available resources and the classified plurality of clusters;
 wherein a first pre-provisioned resource set type is configured to provide automatic resource scaling of a first plurality of the plurality of applications and a second pre-provisioned resource set type is configured to provide automatic resource scaling of a second plurality of the plurality of applications, the plurality of pre-provisioned resources types comprising the first and second pre-provisioned resource set types; and
 wherein the first pre-provisioned resource set type is distinct from the second pre-provisioned resource set type.

14. The method of claim 13, wherein the first pre-provisioned resource set type is a first pre-provisioned virtual machine type and the second pre-provisioned resource set type is a second pre-provisioned virtual machine type.

15. The method of claim 13, wherein the determination of the plurality of pre-provisioned resource set types is further based on an over provisioning cost.

16. The method of claim 13, wherein the step of determining the plurality of pre-provisioned resource set types comprises:
 determining a plurality of (V; f) pairs where V is the plurality of pre-provisioned resource set types and f is a function used for selecting a select resource set type from the plurality of pre-configure resource set types for ones of the plurality of data points.

17. The method of claim 16, wherein the step of determining the plurality of pre-provisioned resource set types is further based on minimizing a sum of the squares of the distances between the plurality of data points and corresponding ones of the plurality of pre-provisioned resource set types.

18. The method of claim 16, wherein the step of determining the plurality of pre-provisioned resource set types is further based on minimizing a maximum overhead across the plurality of available resources.

19. The method of claim 16, wherein the step of determining the plurality of pre-provisioned resource set types is further based on minimizing a maximum worst case over-provisioning.

20. The method of claim 13, wherein the number of pre-provisioned resource set types is constrained to a predetermined number of distinct resource configurations.

21. The method of claim 13, wherein the step of determining the plurality of pre-provisioned resource set types is further based on a maximum allowed over-provisioning overhead.

22. A non-transitory computer-readable storage medium storing instructions which, when executed by a computer, cause the computer to perform a method, the method comprising:
 determining a plurality of available resources and a plurality of applications;
 determining an input dataset, the input dataset comprising a plurality of data points indicating an expected resource usage occurring within a future time period and associated with one of the plurality of applications;
 classifying the input dataset into a plurality of clusters based on proximity values of the resource requirements of a plurality of pre-provisioned resource configurations; and
 determining a plurality of pre-provisioned resource set types to pre-configure based on the plurality of available resources and the classified plurality of clusters;
 wherein a first pre-provisioned resource set type is configured to provide automatic resource scaling of a first plurality of the plurality of applications and a second pre-provisioned resource set type is configured to provide automatic resource scaling of a second plurality of the plurality of applications, the plurality of pre-provisioned resources types comprising the first and second pre-provisioned resource set types; and
 wherein the first pre-provisioned resource set type is distinct from the second pre-provisioned resource set type.

* * * * *